US009475960B2

(12) United States Patent
Trewella et al.

(10) Patent No.: US 9,475,960 B2
(45) Date of Patent: Oct. 25, 2016

(54) COATING COMPOSITION

(71) Applicant: Inaeris Technologies, LLC, Pasadena, TX (US)

(72) Inventors: Jeffrey C. Trewella, Kennett Square, PA (US); Vicente Sanchez, Houston, TX (US)

(73) Assignee: Inaeris Technologies, LLC, Pasadena, TX (US)

( * ) Notice: Subject to any disclaimer, the term of this patent is extended or adjusted under 35 U.S.C. 154(b) by 359 days.

(21) Appl. No.: 13/624,379

(22) Filed: Sep. 21, 2012

(65) Prior Publication Data

US 2013/0029168 A1  Jan. 31, 2013

Related U.S. Application Data

(63) Continuation-in-part of application No. 13/526,124, filed on Jun. 18, 2012.

(60) Provisional application No. 61/513,078, filed on Jul. 29, 2011.

(51) Int. Cl.
*C09D 191/00* (2006.01)
*C09D 195/00* (2006.01)
(Continued)

(52) U.S. Cl.
CPC .............. *C09D 191/00* (2013.01); *C08H 8/00* (2013.01); *C09D 195/00* (2013.01); *C10G 3/42* (2013.01); *C10G 3/50* (2013.01); *C10B 49/22* (2013.01); *C10B 53/02* (2013.01); *C10B 57/06* (2013.01); *C10G 2300/1014* (2013.01); *C10G 2300/202* (2013.01); *Y02E 50/14* (2013.01); *Y02P 30/20* (2015.11); *Y10T 428/31815* (2015.04); *Y10T 428/31819* (2015.04); *Y10T 428/31823* (2015.04)

(58) Field of Classification Search
CPC .... C09D 195/00; C09D 191/00; C10G 3/42; C10G 3/50; C10G 2300/202; C10G 2300/1014; C08H 8/00; C10B 49/22; C10B 53/02; C10B 57/06; Y10T 428/31815; Y10T 428/31819; Y10T 428/31823; Y02E 50/14
USPC .................................. 428/489–491, 141–150
See application file for complete search history.

(56) References Cited

U.S. PATENT DOCUMENTS 4,670,613 A   6/1987 Ruyter et al.
5,164,002 A   11/1992 Ballenger, Jr. et al.
(Continued)

FOREIGN PATENT DOCUMENTS

KR   100857247   9/2008
WO   WO01/59008   8/2001
(Continued)

OTHER PUBLICATIONS

International Search Report for PCT Application No. PCT/US2012/045661; filed on Jul. 6, 2012; 10 pages.
(Continued)

*Primary Examiner* — Nathan Van Sell
(74) *Attorney, Agent, or Firm* — Dunlap Codding, P.C.

(57) ABSTRACT

Coating compositions containing components derived from the thermo-catalytic conversion of biomass are provided. The components derived from the thermo-catalytic conversion of biomass are useful in increasing the bond strength retention of such coating compositions to the surface of a substrate.

17 Claims, 4 Drawing Sheets

(51) Int. Cl.
  *C10G 3/00* (2006.01)
  *B32B 11/00* (2006.01)
  *C08H 8/00* (2010.01)
  *C10B 49/22* (2006.01)
  *C10B 53/02* (2006.01)
  *C10B 57/06* (2006.01)

(56) References Cited

U.S. PATENT DOCUMENTS

| | | |
|---|---|---|
| 6,512,090 B1 | 1/2003 | Suchanec et al. |
| 6,749,677 B2 | 6/2004 | Freisthler |
| 8,168,840 B2 | 5/2012 | Brady et al. |
| 8,476,480 B1 | 7/2013 | Brown et al. |
| 2003/0212168 A1 | 11/2003 | White et al. |
| 2008/0314294 A1 | 12/2008 | White et al. |
| 2010/0212215 A1 | 8/2010 | Agblevor |
| 2010/0275817 A1 | 11/2010 | Williams et al. |
| 2011/0154720 A1 | 6/2011 | Bartek et al. |
| 2011/0167713 A1 | 7/2011 | Quignard et al. |
| 2011/0184215 A1 | 7/2011 | Jess et al. |
| 2011/0258914 A1 | 10/2011 | Banasiak et al. |
| 2011/0259239 A1 | 10/2011 | Wen et al. |
| 2011/0294927 A1 | 12/2011 | Williams et al. |
| 2012/0204481 A1 | 8/2012 | Corredores et al. |

FOREIGN PATENT DOCUMENTS

| | | |
|---|---|---|
| WO | WO2010/033512 | 3/2010 |
| WO | 2010135734 | 11/2010 |

OTHER PUBLICATIONS

International Search Report for PCT Application No. PCT/US2013/058024; filed on Sep. 4, 2013; 10 pages.

COATING COMPOSITION

FIELD OF THE INVENTION

Embodiments of the present invention relate generally to coating compositions useful in coating and/or repairing surfaces such as roads, roofs, runways, parking lots, walls, etc. . . . . Particularly, the invention relates to the use of components of oil derived from the thermo catalytic conversion of biomass as such coating materials.

BACKGROUND OF THE INVENTION

Restoring deteriorated pavements by "top coating" is a particularly attractive alternative for the various Departments of Transportation (DOT's) charged with maintaining the roads of their States because it offers a cost effective means to extend the service life of pavements. At a November 2010 Sponsors Meeting of the National Center for Asphalt Technology, several participants indicated that the majority of their budgets were spent on the rejuvenation and restoration of existing roads rather than on new construction, with many seeking to spend most of their budgets on top coating or thin coating projects as a cost effective way to restore or rejuvenate pavement. Residential driveways and commercial parking lots are also regularly top coated in order to extend their serviceable lives. Other than roads, driveways and parking lots, top coating is also used at airports on runways, taxiways, and desalting stations, not only to increase service life, but also as a means to increase resistance to jet fuel spills and aggressive desalting cocktails such as those containing glycols. Gilsonite is a natural asphalt material having a relatively high molecular weight and a much higher softening point (200-210° F.) than traditional asphalt (120-130° F.). These properties tend to make Gilsonite more resistant to solvent attack, but also result in a more brittle material which is prone to cracking under load, especially during periods of low temperature.

Additionally, conventional crude-based asphalt coating compositions can have relatively poor adhesion to the substrate in the presence of water. The eventual penetration of environmental water can reach the interface between the coating and the substrate surface, interfering with the bond between the coating and the substrate surface. This can result in flaking of the coating, exposing the substrate surface to weathering and/or solvent attack. In turn, such weathering and/or solvent attack, under load, can lead to substrate/pavement failures including flaked pavement, "raveling", cracking, and potholes.

It would therefore be advantageous to have a coating material produced from a renewable source and that results in enhanced adhesion of the coating to the substrate surface, even in the presence of water. It would also be advantageous if such a coating demonstrated increased resistance to solvent attack.

SUMMARY

In accordance with an embodiment of the present invention, a coating composition is provided and comprises a high molecular weight fraction of a biomass T-C oil produced from the thermo-catalytic conversion of a biomass.

In accordance with another embodiment of the present invention, at least 10% of the carbon atoms of the high molecular weight fraction can be functionalized with a functionalizing component selected from the group consisting of: a hydrogen-bond donor moeity, a hydrogen-bond acceptor moiety, and combinations thereof.

In accordance with another embodiment of the present invention, the high molecular weight fraction can comprise:
(i) at least about 10 wt % furan and phenol compounds,
(ii) less than about 20 wt % oxygen; and
(iii) less than about 5 wt % anhydro sugars.

In accordance with another embodiment of the present invention, a method for coating a predominantly flat surface is provided and comprises applying such coating composition(s) to the predominantly flat surface.

In accordance with another embodiment of the present invention, a composite is provided which comprises: a) a substrate having a predominantly flat surface and b) a coating composition comprising a high molecular weight fraction of a biomass T-C oil produced from the thermo-catalytic conversion of a biomass.

BRIEF DESCRIPTION OF THE DRAWING FIGURES

Embodiments of the present invention are described in detail below with reference to the attached figures, wherein.

Figure 3:
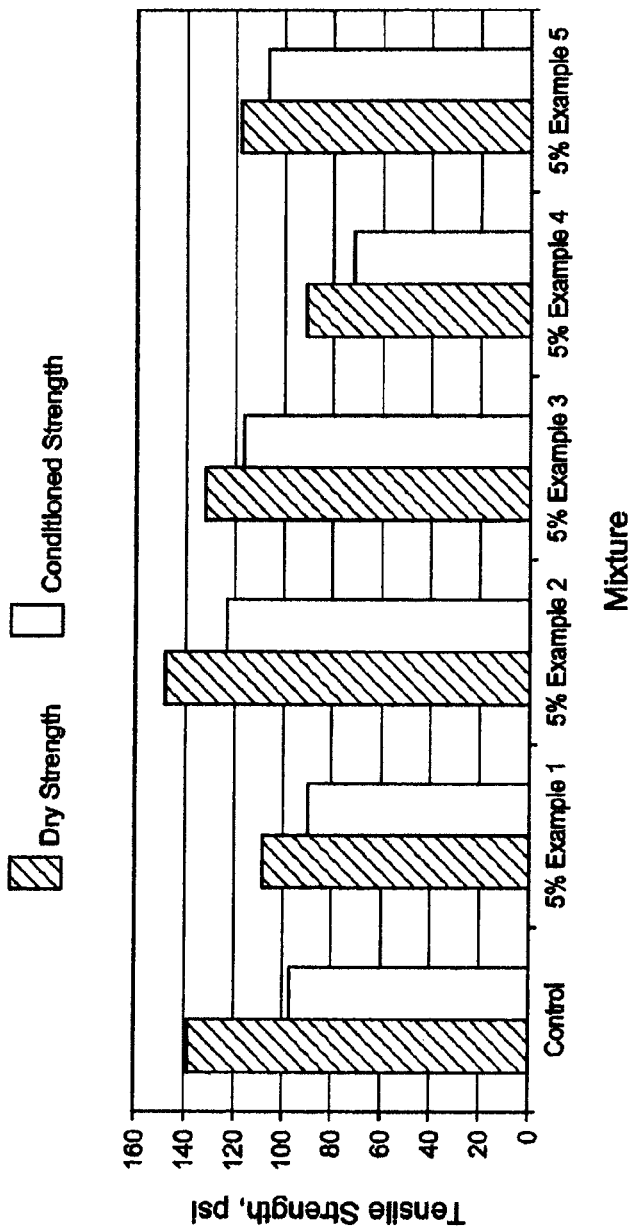

FIG. 3 is a graph illustrating the effect of a high molecular weight fraction of a pyrolysis oil (when used as a biomass pyrolysis oil asphalt binder modifier) and a high molecular weight fraction of a biomass T-C oil produced from the thermo-catalytic conversion of a biomass (when used as T-C oil derived asphalt binder modifiers) on asphalt concrete tensile strength both dry and after water conditioning.

Figure 4:
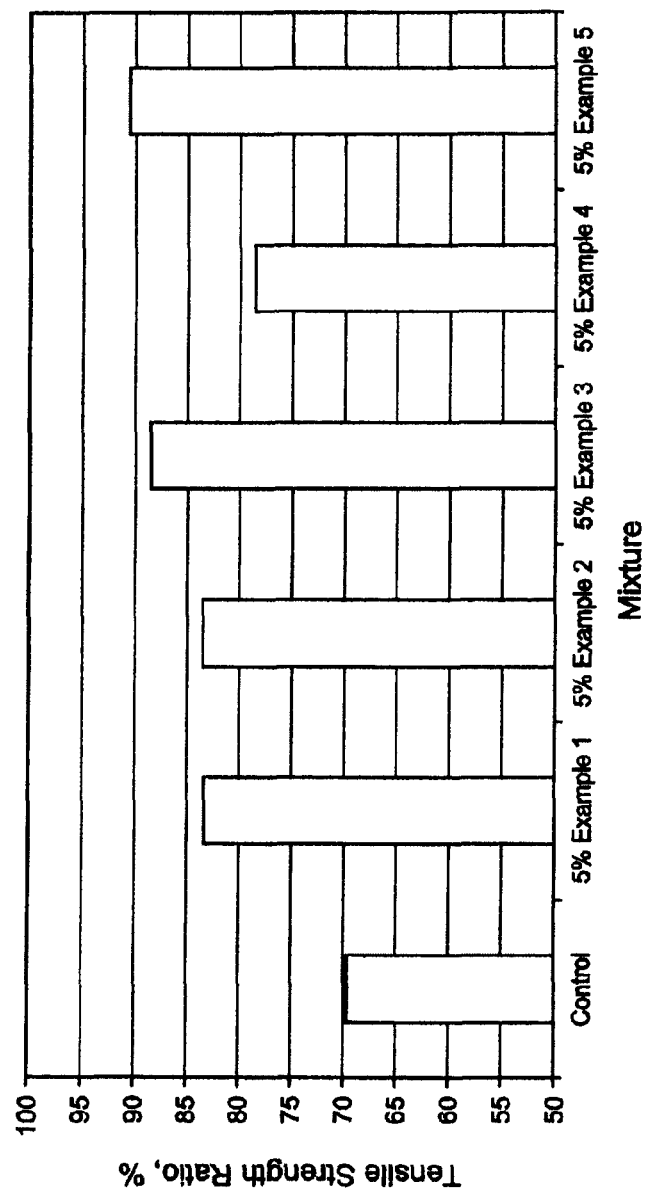

FIG. 4 is a graph illustrating the effect of a high molecular weight fraction of a pyrolysis oil (when used as a biomass pyrolysis oil asphalt binder modifier) and a high molecular weight fraction of a biomass T-C oil produced from the thermo-catalytic conversion of a biomass (when used as T-C oil derived asphalt binder modifiers) on asphalt concrete tensile strength ratio.

DETAILED DESCRIPTION

The following detailed description of the invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Embodiments of the present invention relate generally to coating compositions useful in coating and/or repairing surfaces such as roads, roofs, runways, parking lots, walls, etc. . . . . Particularly, the invention relates to the use of oil derived from the thermo catalytic conversion of biomass as such coating materials.

The present invention relates to the use of biomass T-C oil as at least a portion of a coating composition for coating and/or repairing surfaces including, but not limited to, roads, roofs, runways, parking lots, and walls. As used herein, "biomass T-C oil" refers to oil from the thermo-catalytic conversion of biomass, as further described below.

Pyrolysis as used herein refers to non-catalytic pyrolysis processes. Fast pyrolysis processes are pyrolysis process for converting all or part of the biomass to bio-oil by heating the biomass in an oxygen-poor or oxygen-free atmosphere. The biomass is heated to pyrolysis temperature for a short time compared with conventional pyrolysis processes, i.e. less than 10 seconds. Pyrolysis temperatures can be in the range of from about 200° C. to about 1000° C. Often the biomass will be heated in a reactor using an inert heat carrier, such as sand. As used above, the term "oxygen-poor" refers to an atmosphere containing less oxygen than ambient air. In general, the amount of oxygen should be such as to avoid combustion of the biomass material, or vaporized and gaseous products emanating from the biomass material, at the pyrolysis temperature. Preferably the atmosphere is in the substantial absence of oxygen (or essentially oxygen-free), that is, contains less than about 1 weight percent oxygen.

Biomass thermo-catalytic conversion as used herein refers to a catalytic pyrolysis, wherein a catalyst is used to help facilitate conversion of the biomass under fast pyrolysis type conditions, as described above. Accordingly, in a biomass thermo-catalytic conversion process a catalyst is used in the reactor to facilitate the conversion of the biomass to oil (biomass T-C oil). The catalyst can be pre-mixed with the biomass before introduction into the reactor or be introduced into the reactor separately. If introduced separately into the reactor a particulate catalyst can be used in place of all or part of the inert heat carrier. The catalyst can be a heterogeneous acid catalyst. The thermo-catalytic conversion of biomass results in conversion products comprising water, non-condensable gas, $CO_2$, CO, and the biomass T-C oil, and at least a portion of the biomass T-C oil can be separated from the conversion products. The biomass T-C oil can be separated from the conversion products by gravity separation.

It has been discovered that certain fractions of biomass T-C oil produced by biomass thermo-catalytic conversion have an advantageous effect when used as at least a portion of a coating composition to coat and/or repair surfaces, as described herein.

The coating compositions representing embodiments of the inventive concepts described herein comprise, consist of, or consist essentially of compounds derived and/or separated from biomass T-C oil, which are higher molecular weight components or fractions of the biomass T-C oil, that is those components having a boiling point of at least about 450° F. (232° C.), or at least about 650° F. (343° C.).

The coating composition(s) can comprise, consist of, or consist essentially of biomass T-C oil derived organic compounds having a boiling point of at least about 650° F. (343° C.) and having furan and phenol compounds as dominant species. The coating composition can comprise at least about 2 wt %, or at least about 5 wt % of said high molecular weight fraction; and can comprise crude-oil derived asphalt-range material. At least about 10%, or at least about 30% of the carbon atoms of the high molecular weight fraction can be functionalized with a functionalizing component selected from the group consisting of: a hydrogen-bond donor moeity, a hydrogen-bond acceptor moiety, and combinations thereof. The hydrogen-bond donor moiety can be selected from the group consisting of phenols, alcohols, carboxylic acids, and combinations thereof; and the hydrogen-bond acceptor moiety can be selected from the group consisting of furans, benzofurans, dibenzofurans, ethers, cyclic ethers, ketones, aldehydes, phenols, alcohols, carboxylic acids, and combinations thereof. While not wishing to be bound by any particular theory, in general, hydrogen-bond accepters have a lone pair of electrons (such as an oxygen atom) suitable for accepting; and hydrogen-bond donors have a labile hydrogen atom (such as OH, SH, or NH moiety) suitable for donation.

At least about 10 weight percent of the high molecular weight fraction can be furan and phenol compounds. Generally, the amount of furan and phenol compounds can be less than about 40 weight percent, or can be less than about 20 weight percent, hence they can be present in an amount from about 10 weight percent to about 40 weight percent and can be from about 10 weight percent to about 20 weight percent. Additionally, the high molecular weight fraction can have an oxygen content less than about 20 weight percent, or at least about 4 weight percent and less than or equal to about 18 weight percent, or at least about 6 weight percent and less than or equal to about 14 weight percent. Also, the high molecular weight fraction can have an anhydro sugar content of less than about 5 weight percent, or less than about 1 weight percent.

The biomass T-C oil composition useful in the embodiments of the inventive concepts described herein can be produced by the biomass thermo-catalytic conversion process described above. The biomass T-C oil can be subsequently separated by a fractionation process into a high molecular weight fraction and a lower molecular weight fraction, wherein, in accordance with one embodiment, the coating composition can comprise, consist of, or consist essentially of at least a portion of the high molecular weight fraction, which can be without undergoing a hydrogenation or hydrogenolysis process, such as hydrotreating, prior to use as at least a portion of the coating composition. Such separation/fractionation process can be any such process capable of separating out the target high molecular weight fraction.

At least a portion of the biomass T-C oil can be at least partially hydrotreated prior to separating the high molecular weight fraction therefrom, which will also be at least partially hydrotreated. Alternatively, after separation from the biomass T-C oil, the high molecular weight fraction can be at least partially hydrotreated. Further, such at least partially hydrotreated high molecular weight fraction, however acquired, can have an oxygen content lower than the oxygen content of the non-hydrotreated biomass T-C oil. In addition, the oxygen content of the at least partially hydrotreated high molecular weight fraction can be less than about 10 weight %, or less than about 2 weight % oxygen, and the high molecular weight fraction can have a boiling point of at least about 650° F. The oxygen content of such at least partially hydrotreated high molecular weight fraction can also be in the range of from about 2 weight % to about 10 weight %, or from about 4 weight % to about 8 weight % oxygen.

In one such embodiment, the high molecular weight fraction used as at least a portion of the coating composition can be produced by mixing an upgraded high molecular weight fraction which can comprise hydrocarbons that are essentially free of heteroatoms and which can comprise less than 1 weight percent oxygen (or a "hydrotreated fraction" of the biomass T-C oil) as a first component with a non-hydrotreated high molecular weight fraction as a second component (or a "non-hydrotreated fraction" of the biomass T-C oil). The upgraded fraction can be produced by hydrotreating (hydrogenolysis and hydrogenation) a portion of the above described high molecular weight fraction, such as by processing in a hydrotreater. Each of the fractions can have a boiling point of at least about 650° F. (343° C.). More specifically, the high molecular weight fraction to be used as at least a portion of the coating composition of this embodiment can be obtained by: (i) hydrotreating a portion of the biomass T-C oil to produce a hydrotreated biomass T-C oil; (ii) separating a fraction having a boiling point of at least about 650° F. from the hydrotreated biomass T-C oil, thereby forming the first component; and (iii) separating a fraction having a boiling point of at least about 650° F. from the non-hydrotreated biomass T-C oil, thereby forming the second component.

In this embodiment the hydrotreated fraction and non-hydrotreated fraction can both be present in an amount of about 0.5 weight percent to about 3 weight percent of the coating composition, or from about 1 weight percent to about 2.5 weight percent. The hydrotreated and non-hydrotreated fractions can also be present in nominally equal amounts with the total of both fractions being about 2 weight percent to about 5 weight percent of the asphalt binder composition, or from about 3 weight percent to about 4 weight percent.

In accordance with another such embodiment, it is within the scope of the invention that instead of hydrotreating only a portion of the biomass T-C oil, that the entire biomass T-C oil can be subjected to partial hydrogenation to reduce the oxygen content, followed by separating a fraction having a boiling point of at least about 650° F. from the partially hydrotreated biomass T-C oil, thereby forming a partially hydrotreated high molecular weight fraction useful as at least a portion of the coating composition, and which can have less than about 10 weight %, or less than about 2 weight % oxygen. This partially hydrotreated high molecular weight fraction can make up about 2 weight percent to about 5 weight percent of the coating composition, or from about 3 weight percent to about 4 weight percent.

The coating compositions described above can be applied as a coating to a predominantly flat surface to provide a coating and/or to repair the surface. The coating composition can be applied to the predominantly flat surface as a neat compound. Alternatively, the viscosity of the coating composition can be reduced by mixing with an asphalt fluxing agent prior to application to the predominantly flat surface. As another alternative, the coating composition can be applied to the predominantly flat surface as a component of an aqueous emulsion. The predominantly flat surface can be any surface capable of accepting a coating of the coating composition, and more particularly, can be, but is not limited to, a concrete surface, an asphalt surface, the surface of at least one roofing shingle, the surface of at least one ethylene propylene diene monomer roofing sheet, or the surface of at least one tar paper sheet. The bond strength retention between the coating composition(s) and the predominantly flat surface in the presence of, or upon extended contact with, water exceeds the bond strength retention when a coating not containing the high molecular weight fraction(s) is used.

Further, a composite can comprise: a) a substrate having a predominantly flat surface, as described above and b) any of the coating compositions comprising a high molecular weight fraction of a biomass T-C oil produced from the thermo-catalytic conversion of a biomass, also as described herein. In forming the composite, the coating composition is applied to the predominantly flat surface of the substrate as described above.

Figure 1:
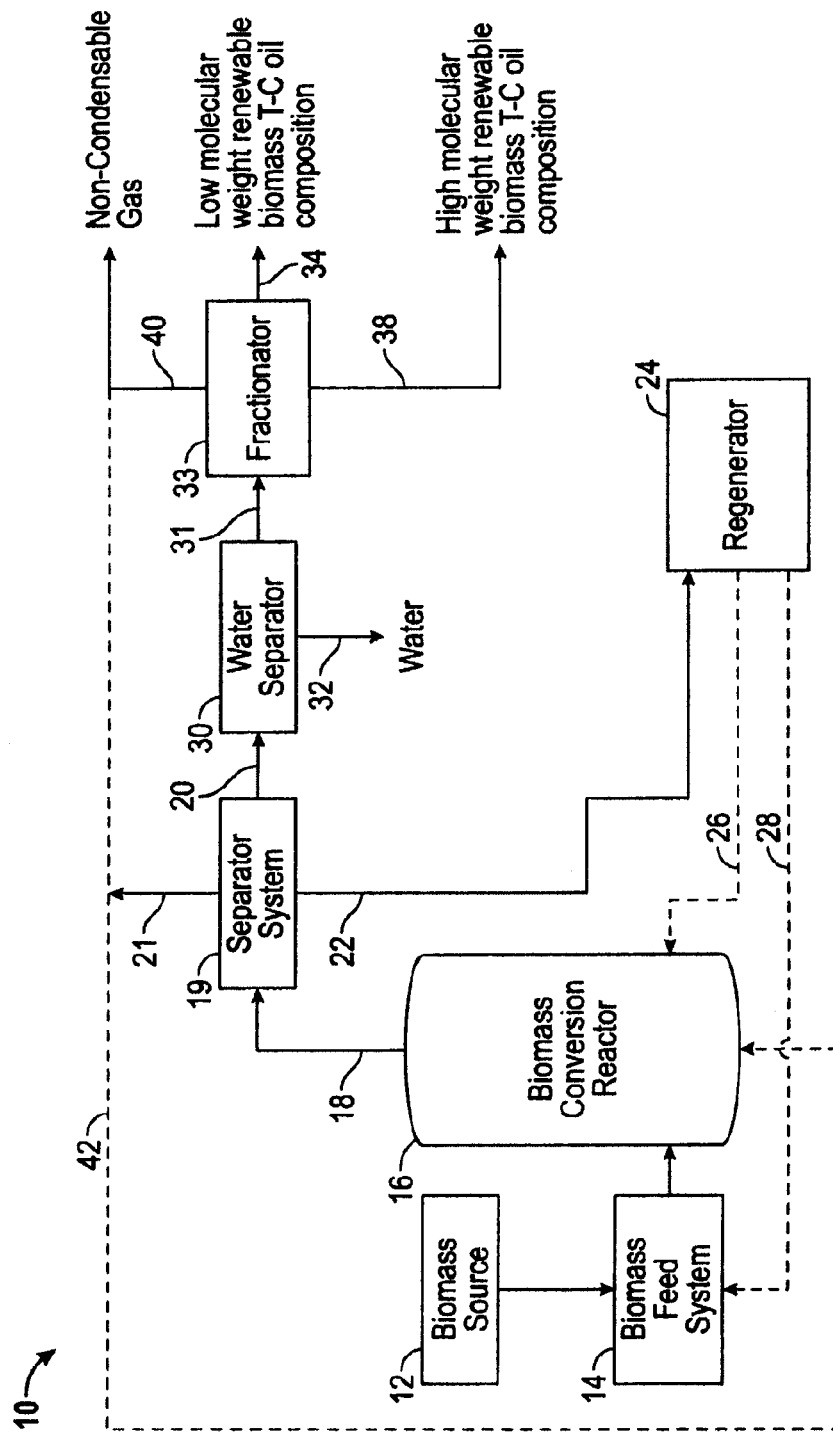
FIG. 1 is a schematic diagram of a biomass conversion system useful in the production of a high molecular weight fraction of a biomass T-C oil produced from the thermo-catalytic conversion of a biomass, which is included as at least a portion of a coating composition.

Turning now to FIG. 1, a process for producing a biomass T-C oil composition suitable for use as described above is illustrated in more detail than previously described. FIG. 1 depicts a biomass conversion system 10. It should be understood that the biomass conversion system shown in FIG. 1 is just one example of a system within which the present invention can be embodied. The present invention may find application in a wide variety of other systems where it is desirable to efficiently and effectively convert a biomass into a biomass T-C oil composition. The exemplary biomass conversion system illustrated in FIG. 1 will now be described in detail.

The biomass conversion system 10 of FIG. 1 includes a biomass source 12 for supplying a biomass feedstock to be converted to biomass T-C oil. The biomass source 12 can be, for example, a hopper, storage bin, railcar, over-the-road trailer, or any other device that may hold or store biomass. The biomass supplied by the biomass source 12 can be in the form of solid particles. The biomass particles can be fibrous biomass materials comprising cellulose. Examples of suitable cellulose-containing materials include algae, paper waste, and/or cotton linters. In one embodiment, the biomass particles can comprise a lignocellulosic material. Examples of suitable lignocellulosic materials include plantation wood, Southern Yellow Pine, forestry waste such as wood chips, saw dust, pulping waste, and tree branches; agricultural waste such as corn stover, wheat straw, and bagasse; and/or energy crops such as eucalyptus, switch grass, and coppice.

As depicted in FIG. 1, the solid biomass particles from the biomass source 12 can be supplied to a biomass feed system 14. The biomass feed system 14 can be any system capable of feeding solid particulate biomass to a biomass conversion reactor 16. While in the biomass feed system 14, the biomass material may undergo a number of pretreatments to facilitate the subsequent conversion reactions. Such pretreatments may include drying, roasting, torrefaction, demineralization, steam explosion, mechanical agitation, sizing reduction, and/or any combination thereof.

In one embodiment, it may be desirable to combine the biomass with a catalyst in the biomass feed system 14 prior to introducing the biomass into the biomass conversion reactor 16. Alternatively, the catalyst may be introduced directly into the biomass conversion reactor 16. The catalyst may be fresh and/or regenerated catalyst. The catalyst can be a heterogeneous acid catalyst; for example it may comprise a solid acid, such as Amberlyst-15, amorphous silica-alumina or a zeolite. Examples of suitable zeolites include ZSM-5, ZSM-11, ZSM-18, ZSM-22, ZSM-23, ZSM-48, Mordenite, Beta, Ferrierite, zeolite-X, and zeolite-Y. Additionally, the catalyst may comprise a super acid. Examples of suitable super acids include Nafion-H, sulfonated, phosphated, or fluorinated forms of zirconia, titania, alumina, silica-alumina, and/or clays. In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcite, clays, and/or combinations thereof. In yet another embodiment, the catalyst can also comprise an alumina, such as alpha-alumina.

It should be noted that solid biomass materials generally contain minerals. It is recognized that some of these minerals, such as potassium carbonate, can have catalytic activity in the conversion of the biomass material. Even though these minerals are typically present during the chemical conversion taking place in the biomass conversion reactor 16, they are not considered catalysts.

The biomass feed system 14 introduces the biomass feedstock into a biomass conversion reactor 16. In the biomass conversion reactor 16, biomass is subjected to a conversion reaction that produces biomass T-C oil. The reactor 16 can be any system or device capable of thermo-catalytically converting biomass to biomass T-C oil. The biomass conversion reactor 16 can be, for example, a fluidized bed reactor, a cyclone reactor, an ablative reactor, or a riser reactor.

In one embodiment, the biomass conversion reactor 16 can be a riser reactor with the conversion reaction being catalytic enhanced fast pyrolysis or biomass thermo-catalytic cracking. As discussed above, the biomass thermo-catalytic conversion should occur in an oxygen-poor or, preferably, oxygen-free atmosphere. In one embodiment, biomass thermo-catalytic conversion is carried out in the presence of an inert gas, such as nitrogen, carbon dioxide, and/or steam. Alternatively, the biomass thermo-catalytic conversion can be carried out in the presence of a reducing gas, such as hydrogen, carbon monoxide, noncondensable gases recycled from the biomass conversion process, and/or any combination thereof.

The biomass thermo-catalytic conversion process is characterized by short residence times and rapid heating of the biomass feedstock. The residence times of the conversion can be, for example, less than 10 seconds, less than 5 seconds, or less than 2 seconds. The biomass thermo-catalytic conversion may occur at temperatures between 200 and 1,000° C., between 250 and 800° C., or between 300 and 600° C.

The catalyst can be used as a heat carrier material and introduced into reactor 16 via line 26 at sufficient temperature to insure that the reaction mixture reaches a temperature between 200 and 1,000° C., between 250 and 800° C., or between 300 and 600° C. In this embodiment, rapid heating of the solid biomass material can generally be accomplished by providing the solid biomass material in the form of particles having a low mean particle diameter. Preferably, the mean particle diameter of the biomass is less than about 2000 μm, and more preferably less than about 1000 μm. The pretreatment of the biomass material can help achieve the desired particle size.

Referring again to FIG. 1, the conversion effluent 18 exiting the biomass conversion reactor 16 generally comprises gas, vapors, and solids. As used herein, the vapors produced during the conversion reaction may interchangeably be referred to as "biomass T-C oil," which is the common name for the vapors when condensed into their liquid state. In the case of a biomass thermo-catalytic process, the solids in the conversion effluent 18 generally comprise particles of char, ash, unconverted portions of biomass and/or spent catalyst. Because such solids (particularly the unconverted biomass and spent catalyst) can contribute to the tendency of the biomass T-C oil to form ash, it is particularly desirable to remove the solids so that biomass T-C oil is essentially solids free, preferably having an ash content (solids content) of less than about 3000 ppm, 2000 ppm or 1000 ppm.

As depicted in FIG. 1, the conversion effluent 18 from the biomass conversion reactor 16 can be introduced into a separator system 19. The separator system 19 can include any conventional device capable of separating solids from gas and vapors such as, for example, a cyclone separator or a gas filter; and can also include a quench or condenser device capable of condensing condensable vapors, separating a substantially solids-free fluid stream 20 from a non-condensable gas stream 21. The separator system 19 removes a substantial portion of the solid particles (e.g., spent catalysts, char, ash, and/or heat carrier solids) from the conversion effluent 18. The solid particles 22 recovered in the separator system 19 can be introduced into a regenerator 24 for regeneration, typically by combustion. After regeneration, at least a portion of the hot regenerated solids can be introduced directly into the biomass conversion reactor 16 via line 26. Alternatively or additionally, the hot regenerated solids can be directed via line 28 to the biomass feed system 14 for combination with the biomass feedstock prior to introduction into the biomass conversion reactor 16. In addition, a solid particles purge stream can be removed from the solid particles either before or after regeneration. Among other purposes, such purge can be for the purpose of removing catalyst in order to maintain activity in biomass conversion reactor 16, or can be for the purpose of removing ash to avoid ash buildup in the system.

The substantially solids-free fluid stream 20 exiting the separator system 19 can then be introduced into a water separator 30 for separation into a biomass T-C oil stream 31 and a water stream 32. The water separator can include, but is not limited to, a decanter, coalescing filter, or centrifuge. The biomass T-C oil stream 31 can then be introduced into a fluids separator (fractionator) 33. It is preferred that the biomass T-C oil stream 31 entering the fluids separator (fractionator) 33 has not previously been subjected to a hydrogenolysis and/or hydrogenation process such as, for example, hydrotreating. Within fluids separator 33, any remaining non-condensable gas is separated from the biomass T-C oil. Additionally, a low molecular weight fraction is separated from a high molecular weight fraction (boiling point at least about 650° F. (343° C.)). The fluids separator 33 can be any system capable of separating the biomass T-C oil stream 31 into a non-condensable gas fraction 40, low molecular weight fraction and high molecular weight fraction. Suitable systems to be used as the fluids separator 33 include, for example, systems for affecting separation by vacuum distillation, wiped film evaporation, fractional distillation, heated distillation, extraction, membrane separation, partial condensation, and/or non-heated distillation and can also be a combination of such separation techniques. As shown in FIG. 1, non-condensable gas stream 21, and any remaining non-condensable gases 40 removed from the fluids separator 33 may be, optionally, recycled via lines 21, 40 and 42 to the biomass conversion reactor 16 for use as a lift gas.

The low molecular weight renewable biomass T-C oil composition is removed from fluids separator 33 via line 34 and the high molecular weight renewable biomass T-C oil composition is removed from fluids separator 33 via line 38. The high molecular weight biomass T-C oil 38 can be utilized as at least a portion of the coating composition, as described above.

Figure 2:
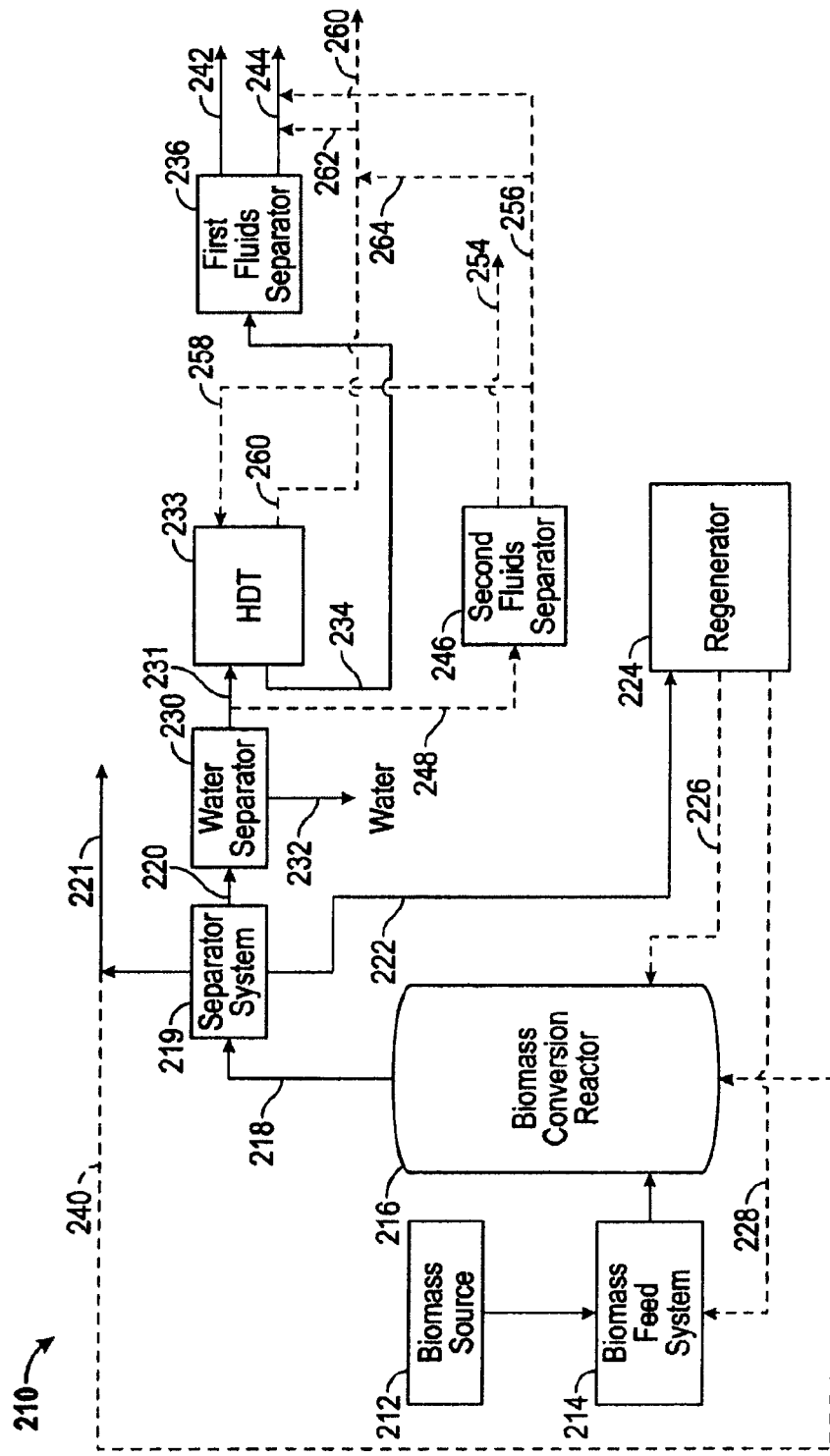
FIG. 2 is a schematic diagram of a biomass conversion system, that includes hydrotreating, and is useful in the production of a high molecular weight fraction of a biomass T-C oil produced from the thermo-catalytic conversion of a biomass, which is included as at least a portion of a coating composition.

Turning now to FIG. 2, a process for producing a biomass T-C oil composition suitable for use as described above is illustrated in more detail than previously described. FIG. 2 depicts a biomass conversion system 210. It should be understood that the biomass conversion system shown in FIG. 2 is just one example of a system within which the present invention produced. The exemplary biomass conversion system illustrated in FIG. 2 will now be described in detail.

The biomass conversion system 210 of FIG. 2 includes a biomass source 212 for supplying a biomass feedstock to be converted to biomass T-C oil. The biomass source 212, and biomass feedstock, can be the same as the biomass source 12 and biomass feedstock described in FIG. 1.

As depicted in FIG. 2, the solid biomass particles from the biomass source 212 can be supplied to a biomass feed system 214, which can be the same as the biomass feed system 14 described above for FIG. 1.

The catalyst useful in this biomass conversion system 210 can be the same as that described above in FIG. 1 for biomass conversion system 10. Biomass conversion reactor 216, including all of its operating conditions and other parameters such as the introduction of the biomass, can be the same as that described in FIG. 1 for biomass conversion reactor 16.

Referring again to FIG. 2, the conversion effluent 218 exiting the biomass conversion reactor 216 generally comprises gas, vapors, and solids. The descriptions regarding the effluent product components and separation described with regard to conversion effluent 18 in FIG. 1 can also apply to the conversion effluent 218.

As depicted in FIG. 2, the conversion effluent 218 from the biomass conversion reactor 216 can be introduced into a separator system 219. The separator system 219 can include any conventional device capable of separating solids from gas and vapors such as, for example, a cyclone separator or a gas filter; and can also include a quench or condenser device capable of condensing condensable vapors, separating a substantially solids-free fluid stream 220 from a non-condensable gas stream 221. Non-condensable gas stream 221 can, optionally, be recycled via lines 221 and 240 to the biomass conversion reactor 216 for use as a lift gas. The separator system 219 removes a substantial portion of the solid particles (e.g., spent catalysts, char, ash, and/or heat carrier solids) from the conversion effluent 218. The solid particles 222 recovered in the separator system 219 can be introduced into a regenerator 224 for regeneration, typically by combustion. After regeneration, at least a portion of the hot regenerated solids can be introduced directly into the biomass conversion reactor 216 via line 226. Alternatively or additionally, the hot regenerated solids can be directed via line 228 to the biomass feed system 214 for combination with the biomass feedstock prior to introduction into the biomass conversion reactor 216. In addition, a solid particles purge stream can be removed from the solid particles either before or after regeneration. Among other purposes, such purge can be for the purpose of removing catalyst in order to maintain activity in biomass conversion reactor 216, or can be for the purpose of removing ash to avoid ash buildup in the system.

The substantially solids-free fluid stream 220 exiting the separator system 219 can then be introduced into a water separator 230 for separation into a biomass T-C oil stream 231 and a water stream 232. The water separator 230 can include, but is not limited to, a decanter, a coalescing filter, and/or a centrifuge. At least a portion of the biomass T-C oil stream 231 can then be introduced into a hydrotreater system 233. The hydrotreater system 233 can include one or more hydrotreaters, each potentially having multiple reaction zones.

The portion of the biomass T-C oil stream 231 sent to hydrotreater system 233 via line 231 is preferably representative in composition as that of the whole biomass T-C oil.

It is preferred that the biomass T-C oil contained in stream 231 and entering the hydrotreater system 233 has not previously been subjected to a hydrogenolysis and/or hydrogenation process such as, for example, hydrotreating. The biomass T-C oil charged to hydrotreater system 233 via line 231 is at least partially hydrotreated in hydrotreater system 233, forming a hydrotreater liquid effluent 234 comprising either a partially hydrotreated biomass T-C oil or an at least substantially fully hydrotreated biomass T-C oil. The hydrotreater system 233 can also include the collection of unreacted hydrogen present in the hydrotreater liquid effluent 234, and recycle of such hydrogen within the hydrotreater system 233.

The hydrotreater liquid effluent 234 is then separated in a first fluids separator 236. A first low molecular weight fraction 242 of the hydrotreater liquid effluent 234 (the hydrotreated biomass T-C oil) is separated from a first high molecular weight fraction 244 (boiling point at least about 450° F. (232° C.), or preferably at least about 650° F. (343° C.)). The first fluids separator 236 can be any system capable of separating the hydrotreater effluent 234 into a first low molecular weight fraction and a first high molecular weight fraction. Suitable systems to be used as the first fluids separator 236 include, for example, systems for affecting separation by vacuum distillation, wiped film evaporation, fractional distillation, heated distillation, extraction, membrane separation, partial condensation, and/or non-heated distillation and can also be a combination of such separation techniques.

The first high molecular weight biomass T-C oil composition 244 can be utilized as at least a portion of the coating composition(s) described above.

Optionally, at least a portion of the biomass T-C oil 231 can be introduced into a second fluids separator 246 via lines 231 and 248. The portion of the biomass T-C oil sent to second fluids separator 246 via lines 231 and 248 is preferably representative in composition as that of the whole biomass T-C oil. It is preferred that the biomass T-C oil contained in stream 248 and entering the second fluids separator 246 has not previously been subjected to a hydrogenolysis and/or hydrogenation process such as, for example, hydrotreating. Within second fluids separator 246 a second low molecular weight fraction 254 is separated from a second high molecular weight fraction 256 (boiling point at least about 450° F. (232° C.), or at least about 650° F. (343° C.)). The second fluids separator 246 can be any system capable of separating the biomass T-C oil contained in stream 248 into a second low molecular weight fraction and a second high molecular weight fraction. Suitable systems to be used as the second fluids separator 246 include, for example, systems for affecting separation by vacuum distillation, wiped film evaporation, fractional distillation, heated distillation, extraction, membrane separation, partial condensation, and/or non-heated distillation and can also be a combination of such separation techniques.

When the hydrotreater effluent 234 is the at least substantially fully hydrotreated biomass T-C oil, then the first high molecular weight biomass T-C oil composition 244 (at least substantially fully hydrotreated) can be utilized as a first component of the high molecular weight fraction used as a portion of the coating composition(s), and the second high molecular weight biomass T-C oil composition 256 (non-hydrotreated) can be utilized as a second component of the high molecular weight fraction used as a portion of the coating composition(s) by: combining the first high molecular weight biomass T-C oil composition 244 with the second high molecular weight biomass T-C oil composition 256 via lines 244 and 256, thereby forming the high molecular weight fraction used as a portion of the coating composition(s). Optionally, in place of or in combination with the biomass T-C oil stream 231 feed to hydrotreater system 233, at least a portion of the second high molecular weight biomass T-C oil composition 256 can be introduced to hydrotreater system 233 via lines 256 and 258 wherein at least a portion of the second high molecular weight biomass T-C oil composition 256 is either partially or substantially fully hydrotreated, forming an alternate hydrotreater effluent 260. The alternate hydrotreater effluent 260 can be utilized as the biomass T-C oil derived asphalt binder modifier of the current invention, or combined with a portion of the first high molecular weight biomass T-C oil composition 244 via lines 260, 262, and 244, and/or combined with a portion of the second high molecular weight biomass T-C oil composition 256 via lines 256, 260 and 264, thereby forming the high molecular weight fraction used as a portion of the coating composition(s).

EXAMPLES

Materials

Table 1 summarizes the five different asphalt-range materials that were derived from lignocelluloses by either fast pyrolysis or biomass catalytic conversion processing followed by some type of fractionation to isolate the high molecular weight components.

percentage of carbon atoms that are functionalized with either a hydrogen-bond donor or a hydrogen-bond acceptor moiety. More particularly, the indole, phenol, and alcohol components include hydrogen-bond donor moieties; and the indole, phenol, alcohol, furan, benzofuran ketone aldehyde, and ether components include hydrogen-bond acceptor moieties. The bond strength of hydrogen-bonds is significantly greater than molecular size based Van der Waals attractive forces, which provides greater intermolecular bond strength between such components and the surface of a substrate as compared to a coating material not including such components.

Examples 1 through 5 were all produced from Southern Yellow Pine chips (a lignocellulosic feedstock). The chips were dried to a nominal 5 weight percent moisture content and sized using a commercial hammer mill to less than 5 mm.

Example 1 is a light distillation residue from renewable T-C oil. For this Example, the lignocellulosic feedstock was converted in a biomass catalytic conversion process in a 10 bbl/day continuous fluidized catalytic cracker using an aluminosilicate catalyst. A riser reactor was used in the conversion process with the riser outlet being at 1000° F. Next, after cooling and removal of solids and non-condensable gases, the free water byproduct was separated from the oil. The T-C oil was then charged to a wiped film evaporator (less than 3 theoretical plates) and the high molecular weight residue was separated from the distillate at a pressure of 10

TABLE 1

|  | Example 1 | Example 2 | Example 3 | Example 4 | Example 5 |
| --- | --- | --- | --- | --- | --- |
| Renewable | So. Yellow Pine | So. Yellow Pine | So. Yellow Pine | So. Yellow Pine | So. Yellow Pine |
| Heat Source | Catalyst | Catalyst | Sand | Catalyst | Catalyst |
| Hydrotreated | None | None | None | Yes | Partial |
| Fractionation | Wiped Film | Vac. Distillation | Vac. Distillation | Vac. Distillation | Vac. Distillation |
| Nominal IBP (° F.) | 450 (232° C.) | 650 (343° C.) | 650 (343° C.) | 650 (343° C.) | 650 (343° C.) |
| Oxygen (wt %) | 15.7 | 12.0 | 28.6 | 0.4 | 6.2 |
| Water Soluble | No | No | Yes | No | No |
| Dominant Species | Furans, Phenols | Furans, Phenols | Anhydro Sugars | Hydrocarbons | Hydrocarbons |
| Performance Grade |  | PG 64-16 | PG 64-22 | PG 58-29 | PG 64-22 |

The material from Example 2 was also subjected to NMR testing, and the results are shown in Table 1A below.

TABLE 1A

| Component | Wt % |
| --- | --- |
| Aliphatics | 21.7 |
| Aromatic | 40.8 |
| Aromatics, Olefins, Indoles | 17.2 |
| Type II Olefins | 1.1 |
| Indoles | 0.3 |
| Furans, Benzofurans | 7.1 |
| Furans, Aromatics | 3.2 |
| Furans, Benzofurans, Phenols | 2.6 |
| Ketone Carbonyls | 0.7 |
| Aldehyde Carbonyls | 0.5 |
| HC(OR)3 | 4.4 |
| Ethers, Alcohols | 0.2 |
| TOTAL | 100 |

As can be seen in the Table 1A above, the compounds of the heavy fraction from the biomass T-C oil include a high torr. This material (Example 1) had a nominal initial boiling point IBP of 450° F. by Gel Permeation Chromatography using polystyrene molecular weight standards.

Example 2 is a heavy residue from renewable T-C oil. Example 2 was prepared in the same way as Example 1 except a batch vacuum distillation unit was used (vs. a wiped film evaporator) to isolate the high molecular weight residue. This residue (Example 2) had a nominal IBP of 650° F. (343° C.) by distillation conditions (boiling point was determined under a vacuum and then the nominal IBP at atmospheric pressure was calculated to be 650° F. (343° C.)).

Example 3 is a heavy residue from pyrolysis oil. For Example 3, the lignocellulose feedstock was converted in a fast pyrolysis using fluidized sand (no catalyst) as the heat transfer media in a unit designed to give equivalent performance to a thermo-catalytic conversion unit. Like with Example 2, a batch vacuum distillation unit was used to isolate the high molecular weight residue.

Example 4 is a heavy residue from a hydrotreated renewable T-C oil. Like Examples 1 and 2, the lignocellulosic feedstock was converted in a biomass catalytic conversion process using the same catalyst. After removing the free water byproduct by decanting, the T-C oil was fed to a fixed bed high-pressure hydrotreater (HDT) where the oxygen level was reduced to less than 1 weight percent. The HDT liquid product was isolated from the gases and then fractionated in a batch vacuum distillation unit to produce a 650° F.+(343° C.+) residue (Example 4).

Example 5 represents a partially hydrotreated sample and was derived by mixing a sample of Example 2 with a sample of Example 4 to produce a 50/50 weight percent blend.

The following testing was performed primarily to evaluate the efficacy of using the high molecular weight fraction of the biomass T-C oil as a modifying component of an asphalt material also containing asphalt and aggregate. The results show superior adhesion of the asphalt material containing asphalt and the inventive high molecular weight fraction to the aggregate, as compared to the use of asphalt materials not containing the inventive high molecular weight fraction. This enhanced adhesion is also demonstrative that the inventive high molecular weight fraction will similarly have a superior bonding strength to the surface of a predominantly flat surface when used as at least a portion of a coating composition.

In the examples below, the neat binder used in the evaluation was PG 64-22 obtained from the Paulsboro, N.J. refinery of NuStar Asphalt, LLC. Table 2 summarizes the performance grading properties of this binder. The neat binder has a continuous performance grade of PG 67.2 (20.8)-26.4.

TABLE 2

| Condition | Test | Temp, ° C. | Result |
|---|---|---|---|
| Tank | Viscosity, Pa · s | 135 | 0.54 |
|  | $G^*/\sin\delta$, kPa | 64 | 1.48 |
|  | AASHTO T 315 | 70 | 0.71 |
| Rolling Thin Film Residue | Mass Change, % | 163 | −0.335 |
|  | $G^*/\sin\delta$, kPa | 70 | 3.51 |
|  | AASHTO T 315 | 76 | 1.64 |
| Pressure Aging Vessel Residue | $G^*\sin\delta$, kPa | 19 | 6270 |
|  | AASHTO T 315 | 22 | 4300 |
|  | Creep Stiffness (MPa)/Slope | −18 | 386/0.305 |
|  | AASHTO T 313 | −12 | 149/0.379 |
| Grade | AASHTO M320 | 64-22 | |
| Continuous Grade |  | PG 67.2 (20.8)-26.4 | |

A coarse, dense-graded 9.5 mm mixture composed of diabase coarse and natural sand fine aggregate was used in the examples below. This mixture was selected because the diabase aggregate is moisture sensitive resulting in typical tensile strength ratios of approximately 70 percent when tested in accordance with the American Association of State Highway and Transportation Officials AASHTO T283 without anti-strip agents. Table 3 summarizes pertinent volumetric properties of the mixture.

TABLE 3

| Property | Value |
|---|---|
| Sieve Size, mm | |
| Gradation 12.5 | 100 |
| 9.5 | 98 |
| 4.75 | 53 |
| 2.36 | 40 |
| 1.18 | 31 |
| 0.600 | 22 |
| 0.300 | 12 |

TABLE 3-continued

| Property | Value |
|---|---|
| 0.150 | 7 |
| 0.075 | 4.8 |
| Asphalt Content, % | 5.7 |
| $N_{design}$ | 100 |
| Design VTM, % | 3.7 |
| Design VMA, % | 15.1 |
| Design VFA, % | 75.5 |
| Dust/effective binder ratio | 1.0 |
| Fine Aggregate Angularity, % | 48.3 |
| Coarse Aggregate Angularity, % | 100/100 |
| Flat and Elongated Particles, % | 7.6 |
| Sand Equivalent | 76.7 |

Each of the five examples were blended at 5 weight percent concentration with neat NuStar PG 64-22 binder and graded in accordance with AASHTO R29. For Examples 2, 3, 4 and 5, a 20 weight percent concentrate was prepared by heating both the cellulosic pyrolysis binder and the neat binder to 175° C. and mixing for 30 minutes with a mechanical stirrer. After the concentrate cooled, it was reheated to 160° C. and additional neat binder also heated to 160° C. was added to reach the target concentration of 5 weight percent. For Example 1, the same process was used; however, lower temperatures were used because Example 1 fumed at temperatures higher than 120° C. Accordingly, a temperature of 115° C. was used for the initial mixing of 20 weight percent concentrate and a temperature of 120° C. was used for the subsequent addition of neat binder.

AASHTO T283 moisture sensitivity testing was conducted on the 5 weight percent blends of the Example 1-5 asphalt binders and on a neat NuStar PG 64-22 binder (Control). The results are shown in FIGS. 3 and 4. FIG. 3 shows the effect on dry tensile strength ("dry strength") and conditioned tensile strength ("conditioned strength") of the addition of each asphalt binder modifier. Dry strength reflects the initial properties of the compacted asphalt concrete according to the AASHTO T283 test procedure, before the impact of weathering. Condition strength reflects the impact of weathering on the compacted asphalt concrete and is achieved by submersion in warm water followed by specimen freezing using the prescribed AASHTO T283 test protocol. Examples 2, 3 and 5 all showed improvement of the conditioned strength as compared to the control and, thus, represent good additives to resist deteriorative effects of weathering. Example 4, the hydrotreated biomass T-C oil asphalt binder modifier, did not show improvement in conditioned strength. Example 5, the blend of Example 2 and 4, exhibited a conditioned strength between that of Example 2 and Example 4 but superior to the conditioned strength of the Control.

Additionally, the superior performance of Example 2 is surprising when the compositions of the Examples are compared (see Table 1). Example 2 performed better than both Examples 3 and 4. Examples 2 and 4 have lower oxygen content and lower content of anhydro sugars than Example 3. Additionally, Examples 2 and 4 are not water-soluble where-as Example 3 is water-soluble. Also, the oxygen content for Example 2 (12.0 wt %) is intermediate to the oxygen contents for Example 3 (28.6 wt %) and for Example 4 (0.4 wt %). Thus, the fact that the tensile strength performance for Example 2 exceeds that for Examples 3 and 4 is unexpected. The compositional differences between Examples 2 and 3, when viewed in light of the performance differences between Examples 2 and 4, further evidences that the performance of non-catalytic pyrolysis oils are not indicative, or predictive, of the performance of a biomass T-C oil as an asphalt binder modifier.

FIG. 4 illustrates the effect of the addition of the asphalt binder modifiers on tensile strength ratio (conditioned strength divided by dry strength). Tensile strength ratio reflects the anti-stripping performance of the asphalt binder modifier. As can be seen, blends using Examples 1-5 all showed improved resistance to moisture damage, as illustrated by the improved tensile ratio, when compared to the neat binder; however, the blend using Example 5 unexpectedly showed clearly superior results for the tensile strength ratio; better than either of its components (Example 2 and Example 4). This, combined with improved conditioned strength of Example 5 over the Control, indicate that Example 5 is a surprisingly superior anti-stripping agent.

While the technology has been particularly shown and described with reference to specific embodiments, it should be understood by those skilled in the art that various changes in form and detail may be made without departing from the spirit and scope of the technology as defined by the appended claims.

As used herein, the terms "a," "an," "the," and "said" means one or more.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or elements recited after the term, where the element or elements listed after the transition term are not necessarily the only elements that make up of the subject.

As used herein, the terms "containing," "contains," and "contain" have the same open-ended meaning as "comprising," "comprises," and "comprise," provided below.

As used herein, the terms "having," "has," and "have" have the same open-ended meaning as "comprising," "comprises," and "comprise," provided above As used herein, the terms "including," "includes," and "include" have the same open-ended meaning as "comprising," "comprises," and "comprise," provided above.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A coating composition, comprising a high molecular weight fraction of a biomass T-C oil, wherein the high molecular weight fraction comprises a non-hydrotreated portion and a portion that has been at least partially hydrotreated, and wherein:
   i) the high molecular weight fraction of the biomass T-C oil is produced from the thermo-catalytic conversion of a biomass and has a boiling point of at least 650° F.;
   ii) at least about 10% of the carbon atoms of said high molecular weight fraction are functionalized with a functionalizing component selected from the group consisting of a hydrogen-bond donor moiety, a hydrogen-bond acceptor moiety, and combinations thereof;
   iii) the at least partially hydrotreated portion of the high molecular weight fraction has an oxygen content less than about 10 wt %; and
   iv) the non-hydrotreated portion of the high molecular weight fraction has an oxygen content less than about 20 wt %.

2. The composition of claim 1, wherein said thermo-catalytic conversion occurs in: (i) a riser reactor; (ii) the substantial absence of oxygen; and (iii) the presence of a heterogeneous acid catalyst.

3. The composition of claim 1, wherein:
   a) said thermo-catalytic conversion of said biomass results in conversion products comprising water, non-condensable gas, $CO_2$, CO, and said biomass T-C oil;
   b) at least a portion of said biomass T-C oil is separated from said conversion products; and
   c) said high molecular weight fraction is separated from said biomass T-C oil.

4. The composition of claim 3, wherein said biomass T-C oil is separated from said conversion products by gravity separation; and wherein said high molecular weight fraction is separated from said biomass T-C oil by vacuum distillation.

5. The composition of claim 3, wherein said thermo-catalytic conversion of said biomass comprises a fast pyrolysis step wherein the biomass is heated at a temperature in a range of from about 200° C. to about 1000° C. for less than 10 seconds.

6. The composition of claim 4, wherein said high molecular weight fraction is at least partially hydrotreated following separation from said biomass T-C oil.

7. The composition of claim 1, wherein said composition comprises:
   the at least partially hydrotreated portion of the high molecular weight fraction in an amount from about 0.5 wt % to about 3 wt % of the composition; and
   the non-hydrotreated portion of the high molecular weight fraction in an amount from about 0.5 wt % to about 3 wt % of the composition.

8. The composition of claim 1, wherein the combined amount of the at least partially hydrotreated portion and the non-hydrotreated portion of the high molecular weight fraction is from about 2 wt % to about 5 wt % of the composition.

9. The composition of claim 1, wherein at least about 30% of the carbon atoms of said high molecular weight fraction are functionalized with a functionalizing component selected from the group consisting of: a hydrogen-bond donor moiety, a hydrogen-bond acceptor moiety, and combinations thereof.

10. The composition of claim 1, wherein upon coating a substantially flat surface with said composition, the bond strength retention between said composition and said predominantly flat surface exceeds the bond strength retention when a coating not containing said high molecular weight fraction is used.

11. The composition of claim 1, wherein:
    said hydrogen-bond donor moiety is selected from the group consisting of phenols, alcohols, carboxylic acids, and combinations thereof; and
    said hydrogen-bond acceptor moiety is selected from the group consisting of furans, benzofurans, dibenzofurans, ethers, cyclic ethers, ketones, aldehydes, phenols, alcohols, carboxylic acids, and combinations thereof.

12. The composition of claim 1, wherein said high molecular weight fraction comprises:
    (i) at least about 10 wt % furan and phenol compounds, and
    (ii) less than about 5 wt % anhydro sugars.

13. The composition of claim 12, wherein said high molecular weight fraction comprises:
    (i) from about 10 weight percent to about 40 weight percent furan and phenol compounds, and
    (ii) less than about 1 weight percent anhydro sugars.

14. A composite, comprising:
    a) a substrate having a predominantly flat surface; and
    b) the coating composition of claim 1.

15. The composite of claim 14, wherein said coating composition is applied to the predominantly flat surface of said substrate.

16. The composite of claim 14, wherein said thermocatalytic conversion occurs in: (i) a riser reactor, (ii) the substantial absence of oxygen; and (iii) the presence of a heterogeneous acid catalyst.

17. The composite of claim 14, wherein said substrate is selected from the group consisting of concrete, asphalt, at least one roofing shingle, at least one ethylene propylene diene monomer roofing sheet, at least one tar paper sheet, and combinations thereof.

* * * * *